United States Patent
Janzig et al.

(10) Patent No.: US 7,065,768 B1
(45) Date of Patent: Jun. 20, 2006

(54) SERVICING METHOD FOR SCRIPT MONITOR COM OBJECT

(75) Inventors: Richard Charles Janzig, Mission Viejo, CA (US); David George Maw, Rancho Santa Margarita, CA (US); Patricia Lynn Maw, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 608 days.

(21) Appl. No.: 10/196,996

(22) Filed: Jul. 16, 2002

(51) Int. Cl.
*G06F 3/00* (2006.01)
*G06F 9/44* (2006.01)
*G06F 9/46* (2006.01)
*G06F 13/00* (2006.01)
*G06F 9/00* (2006.01)
*G06F 17/00* (2006.01)

(52) U.S. Cl. ............ 719/320; 717/115; 718/102; 715/700

(58) Field of Classification Search ......... 719/320; 717/115; 718/102; 715/700
See application file for complete search history.

(56) References Cited

U.S. PATENT DOCUMENTS

| 5,659,547 | A | * | 8/1997 | Scarr et al. ............... 714/4 |
| 5,805,884 | A | * | 9/1998 | Sitbon et al. ............ 719/320 |
| 6,193,631 | B1 | | 2/2001 | Hickman |
| 6,230,078 | B1 | | 5/2001 | Ruff |
| 6,317,792 | B1 | * | 11/2001 | Mundy et al. ............ 709/227 |
| 2002/0169776 | A1 | * | 11/2002 | Tuunanen et al. .......... 707/9 |

OTHER PUBLICATIONS

Cowart, Robert, et al. "Special Edition Using Microsoft Windows 2000 Professional," Feb. 24, 2000, Que, Chapter 36 Windows Scripting Host, pp. 1-5.*

* cited by examiner

*Primary Examiner*—William Thomson
*Assistant Examiner*—Qing-Yuan Wu
(74) *Attorney, Agent, or Firm*—Alfred W. Kozak; Mark T. Starr; Lise A. Rode

(57) ABSTRACT

The method of the present invention is useful in managing scripts easily, by providing a console interface that enables you to list registered scripts and check their status. The program executes a method for allowing scripts or programs to monitor and manage registered scripts. Such a script or program can provide a list of registered scripts based on specific criteria and awaken sleeping scripts.

6 Claims, 4 Drawing Sheets

Monitoring Script

Monitoring Script

REGISTER SCRIPT

VIEWS LIST OF
REGISTERED SCRIPTS

AWAKEN SCRIPT

SERVICING METHOD FOR SCRIPT MONITOR COM OBJECT

FIELD OF THE INVENTION

The present invention generally relates to a service and console interface, called SCRIPTMONITOR, that enables the listing of registered scripts and checking the status of these registered scripts. This method is accomplished by creating scripts or programs to monitor and manage registered scripts.

CROSS REFERENCES TO RELATED APPLICATIONS

This application is related to a co-pending application U.S. Ser. No. 10/197,543 entitled "Method For Managing Script and Utilizing a Script Utility Com Object", which is incorporated herein by reference.

BACKGROUND OF THE INVENTION

Previously, one might have created batch files or command files to help automate some system operations. Scripts can serve a similar purpose. Microsoft provides scriptable interfaces for their newest tools for local system control. In fact, scripting languages were intentionally designed to be simple, so that one does not have to be an engineer or programmer to use them. There are several ways to run scripts today, specifically using Windows Script Host, and Scheduled Tasks Facility. These tools allow one to initiate scripts, and enable one to schedule scripts for later execution or for repeated execution. Therefore, there is an easier way to manage scripts using a scriptable interface that allows one to register and manage scripts.

In order to ensure high availability and proper performance of a system, it is useful to monitor various aspects of the system to detect and respond to problems as quickly as possible. In the Windows operating system environment, for example, scripts are frequently used for this purpose because they provide a simple deployment method for a reproducible and easily modifiable sequence of detection and response statements. At the current time, there is no easy unobtrusive way to keep a script running and responsive using the most popular scripting language (VBScript) in the Windows operating system environment.

One prior art method to which the method of the present invention generally relates is described in U.S. Pat. No. 6,317,792 entitled "Generation And Execution Of Scripts For Enabling Cost-Effective Access To Network Resources." This prior art method is a cluster controlling system that transfers packages, which have been operating on one computer to another computer when a fault or failure has occurred by monitoring and controlling the packages in the entire system. When the respective packages are started-up, cluster daemons on the respective computers monitor and control resources on the operating computers. The monitored and controlled data are stored in the respective computers as local data. A manager communicates with cluster daemons on the respective computers, and stores data in a global data memory to monitor and control the entire system. The manager is actually one of the packages operating in the cluster system. If a fault or failure occurs in the manager or in the computer running the manager, the manager is restarted on another computer by a cluster daemon.

The present invention differs from this cited prior art patent in that the prior invention simply uses a script for the specific purpose of selecting a host for an Internet connection, whereas the present invention is concerned with interacting with any user-written script. The prior invention does not focus on any user interaction with the script.

Another prior art method to which the method of the present invention generally relates is detailed in U.S. Pat. No. 5,659,547 entitled "Script-Based System For Testing A Multi-User Computer System." This prior invention is a testing system and method for defining testing scenarios for a multi-user computer system having a plurality of workstations, and for driving and tracking the execution of the testing scenarios in a predefined order at the workstations is disclosed. The system and method revolve around the concept of a "script". Each script or script set is intended to reflect one business scenario. Each script contains instructions, data, and routing information used to execute the testing scenario on the workstations of the multi-user computer system. The testing system includes a maintenance and creation means for creating and modifying scripts; a tracking administration means for grouping selected scripts to form the test, for initiating a test run, for monitoring routing of the scripts from workstation to workstation, for selectively controlling routing of the scripts from workstation to workstation in an error situation, and for automatically generating statistical reports detailing the performance of the test; and a tracking means for routing the selected scripts to selected workstations according to the routing information.

The method of this prior invention uses specific scripts for testing and allows a user to group and deploy different script modules together to test different things. There is no mention of any user interaction with the scripts once they are initiated in the prior invention. Contrarily, the present invention allows any user-written script to be suspended indefinitely and invisibly until resumed or terminated by an external agent through a centralized control point.

Yet another prior art method to which the method of the present invention generally relates is detailed in U.S. Pat. No. 5,805,884 entitled "Process For Monitoring Execution Of A Command Script." This prior art method is a process for monitoring the acknowledgement of a request to execute a command script (script) through a non-guaranteed protocol (S.N.M.P.), in an information system (SI) in a network (RE) comprising a manager (GE) and agents (AG1) for executing commands, wherein the manager first sends the agent in charge of executing the command script a ticket request using a command (Get mrsGetTK) of the "get" type, and the agent returns (GetResponse) a ticket to the manager. The manager then sends the execution request to the agent using a command (Set mrsExecute cmd TK) of the "set" type, for which the ticket is a parameter, then the agent verifies the validity of the request and creates an instance for the execution of the command associated with the ticket and the manager then verifies proper reception of the request by scanning (Get mrsStatus) the instance using the agent. This prior invention is particularly applicable to heterogeneous information systems.

The present invention differs from this prior art in that the prior patent deals with using a specific kind of script for a particular purpose. The present invention, however, deals with any WSH (Windows Script Host) script. The prior art invention is not even particularly concerned with the script itself, but just with getting an acknowledgement that a script has run. Once again, there is no mention of user interaction in this prior art invention. The present invention differs because of the user interaction, and that it allows active control over the resumption/termination of a script.

Yet another prior art method to which the method of the present invention generally relates is detailed in U.S. Pat. No. 6,193,631 entitled "Force Script Implementation Over A Wide Area Network." This prior art method is an exercise system includes a local system having an exercise apparatus and an associated local computer, where the local computer controls and monitors the operation and use, respectively, of the exercise apparatus. The system further includes a remote system having a remote computer, and a transmission medium including a telephone line that couples the local system to the remote system for data communication between the local system and the remote system. The remote system may receive local system data from the local system concerning the use of the exercise apparatus, and the local system may receive remote system data from the remote system concerning the operation of the exercise apparatus. The local computer preferably controls the operation of the exercise apparatus based upon a modifiable script stored in a read/write memory of the local computer, which can be updated by the remote system. A method for controlling an exercise apparatus includes running a modifiable script on a local computer to control the use and to monitor the operation of an exercise apparatus, and communicating with a remote system to provide the remote system with data concerning the use of the exercise apparatus. The script is stored in read/write memory of the local computer and remote system data received from the remote system may include at least a portion of a new script to be stored in the read/write memory of the local computer.

This prior art method is different from the present invention in that the prior art invention does not mention user interaction. This prior art invention simply uses a fixed script to perform testing, with no user interaction. The present invention is concerned with interacting with any user-written script.

Yet another prior art method to which the method of the present invention generally relates is detailed in U.S. Pat. No. 6,230,078 entitled "Simplified Animatronic And CNC System." This prior invention is a simplified system using a computer to control the speed and direction of multiple stepper motors, so that a script for a sequence of operations of the motors can be prepared and edited, using ASCII characters, on the computer monitor. This script is then stored on disc, and can be played back through the parallel port to control the motors to perform the sequence of operations. Each letter of the alphabet can identify a different motor speed, and each line of the script contains one letter for each motor being controlled. On commencing play back, the first line is scanned and the required motor speeds set and activated. After about 1/20 of a second the next line is similarly scanned and the motor speeds are again adjusted to the current script requirements. Playback then proceeds in the same manner line by line through the script. The system can also be applied to CNC (computer numerical control) of machine tools and production processes. A synchronized digital control system gives excellent positional control of motorized elements. The system includes fine and coarse feed rates in CNC operation by means of two motors selectively controlling the same axis, coupled by a differential gearing drive.

This prior art method is different from the present invention in that the prior art invention does not mention user interaction. The prior art invention simply pertains to a script that performs a single fixed task with no user intervention.

SUMMARY OF THE INVENTION

It is therefore an object of the present invention to allow a console interface to enable the listing of registered scripts and to check their status.

Still another object of the present invention is to check the status of registered scripts.

Still another object of the present invention is to create scripts or programs to monitor and manage registered scripts.

Still another object of the present invention is to provide a list of registered scripts based on specific criteria.

Still another object of the present invention is to awaken sleeping scripts.

Still another object of the present invention is to enable the tracking of scripts that are registered with a Script Utility object.

Still another object of the present invention is to display the scripts' attributes.

The present method provides a specialized method for managing the monitoring of registered scripts that can support the utilization of applications being run. Here, a Script Monitor object is created whereby a series of registered scripts can be awakened and managed. Means are provided for allocating a unique "registration" handle for the script, once determined if it is, indeed registered. A Script Utility object in the SCRIPTMONITOR object enables the registration of a list of scripts.

One way in which this feature of managing scripts has been incorporated is through a single SCRIPTMONITOR object, which runs as a service on the system. This service provides centralized control of all scripts that have registered with it through an associated ScriptUtility Object. The SCRIPTMONITOR object enables the tracking of scripts registered by a ScriptUtility object. The object just described is an out-of-process (Component Object Model) COM service whose code is contained in the executable file of the SCRIPTMONITOR. A script can create an instance of this object, which will actually be a reference to the single SCRIPTMONITOR service.

A Monitor subroutine will create a SCRIPTMONITOR object and display all of the REGISTEREDSCRIPTs. A particular REGISTEREDSCRIPT can be singled out from the set of all REGISTEREDSCRIPTs and a handle to the selected script can be returned.

Included in this method is an awaken method that can resume any other (sleeping) script known to the SCRIPTMONITOR which provides the described scriptable functionality. The awaken method supports continuing execution of a sleeping script with the next statement in the script after the Sleep or immediate termination of a sleeping script without further execution.

Also included in this method is the ability to enumerate all scripts registered with the service, allowing a user to select one or more registered scripts based on their file name, account (user) name, or the user-settable description registered with the script. Once a script has been selected, the awaken method can be used to resume its execution.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

GLOSSARY OF RELEVANT ITEMS

Figure 1:
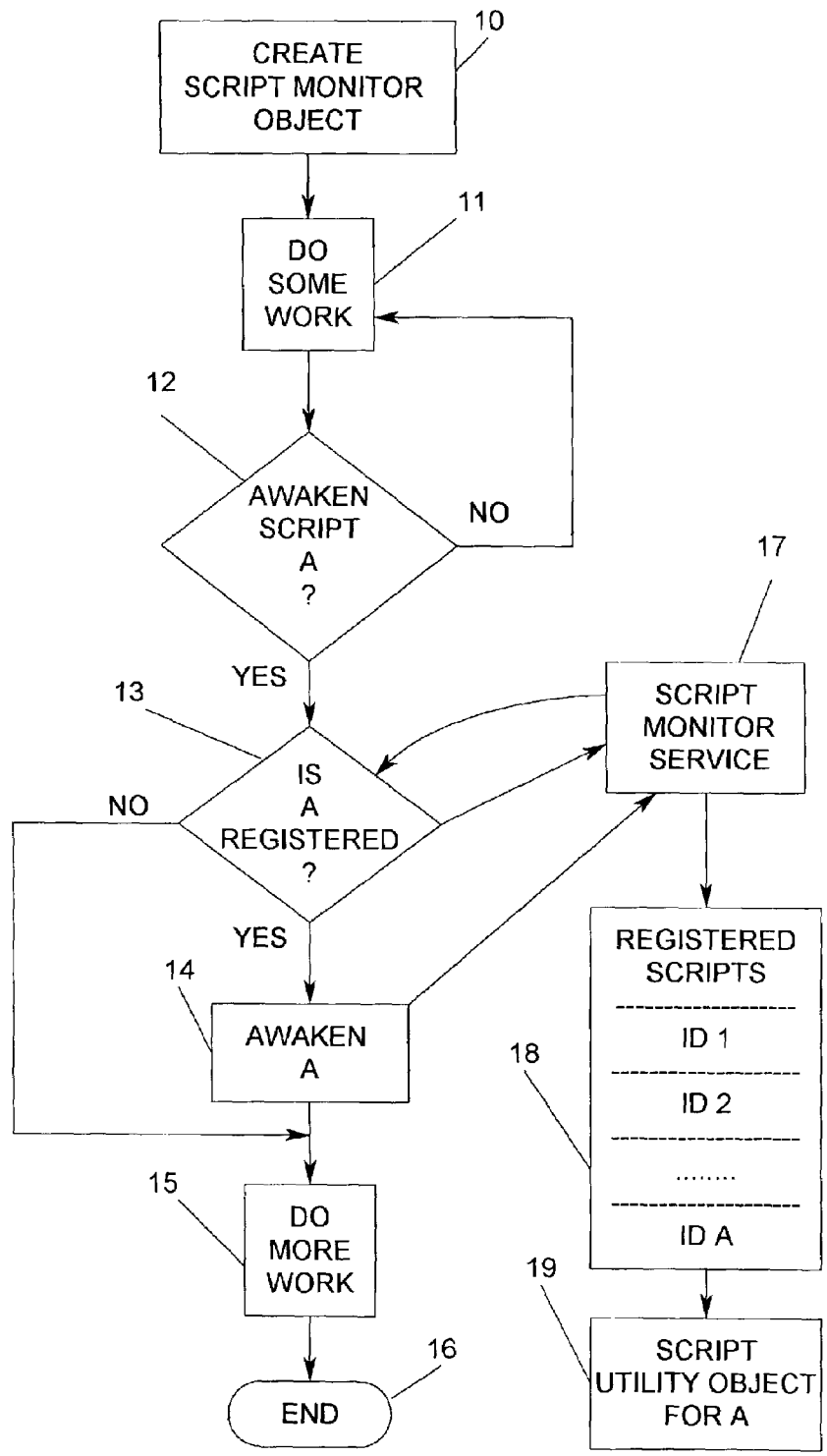
FIG. 1 is a generalized block diagram of a monitoring script system that may use the method of the present invention.

1. Script: A script is a set of instructions that automate the operation of an application or utility program. The instructions usually use the rules and syntax of the application and utility program.

2. COM (Component Object Model) Object: A component written to the COM standard that provides interfaces which can be invoked by applications. This is a specification developed by Microsoft for building a software component that can be assembled into programs or to add functionality to existing programs running on Microsoft platforms.

3. Sentinel: A software suite sold with the Unisys ES7000 group and ClearPath Plus servers to provide platform management capabilities.

4. Server Director (scripts): Scripts written in the Server Director scripting language to run in the Server Director application environment. Server Director is a product that is sold at Unisys, based on the NetIQ AppManager. It hosts and provides a graphical user interface for deploying scripts and monitoring their results.

5. Windows Script Host (WSH): A Microsoft application that hosts library modules capable of processing various kinds of scripts. Provides access to Windows resources.

6. Scheduled Tasks Facility (see Glossary # 23—Microsoft Task Scheduler): Can be used to initiate scripts at preselected times. The task scheduler service is automatically installed with the Microsoft Windows operating system.

7. Script Utility: A set of COM objects that make managing scripts easier by providing a scriptable interface that enables you to register and manage scripts.

8. ScriptUtility callback method waittimer: Windows callback used to associate the script statements in the OnInterval block of a script with expiration of the Interval timer. The callback is a Windows mechanism for hooking up the expiration of the timer to the invocation of the OnInterval block. This mechanism is not viewable, it happens in the core of the operating system.

9. OnInternal Event: An event that is fired by a ScriptUtility object at a certain regular time period specified by the object's Interval property. The OnInterval event allows a script to be awakened periodically. An event will be caused each time the number of seconds specified by the interval property elapses after the Interval property has been set to a value greater than zero (0). (Also described in Glossary #34)

10. VBScript: Microsoft's scripting language, which is an extension of their Visual Basic language. VBScript can be used with Microsoft applications and others. It can also be embedded in web pages processed by Internet Explorer.

11. MsgBox (Message Box): A VBScript function that displays a descriptive message in a dialog box, waits for the user to click a button, and returns a value indicating which button the user clicked.

12. ScriptUtility Object: A COM object that supports Sleep, Awaken, and Register methods, Interval, Visible, Description, and MsgString properties, and an OnInterval event.

13. Sleep method (WSH—Windows Script Host): A method that suspends script execution for a specified length of time and then continues.

14. Task bar: The bar that contains the Start button and buttons representing other running programs that appears by default at the bottom of a Windows screen.

15. Standard VBScript MsgBox (statement): A statement used to display a descriptive message. See "MsgBox" (above, Glossary #11).

16. ScriptUtility Register Method: This method enables a script to be included in the list of registered scripts for SCRIPTMONITOR object. Including a script in the registered script list provides external control for the lifetime of the script. A script can call the Register method only one time during its execution. If a script has instantiated more than one ScriptUtility object, it can use only one of the objects to register the script.

17. SCRIPTMONITOR Service: A component within the Script Utility set that enables you to monitor and manage scripts that are registered with ScriptUtility. This is the console interface within Script Utility that enables you to list registered scripts and awaken a sleeping script. Awaken implies that a registered script can be accessed and executed.

18. Scripted Tasks: Tasks that have been automated by, and can be utilized by accessing and executing them using a script.

19. Elapsed time processing: Execution of script statements at regular time intervals, as specified by an object's "Interval property" in a ScriptUtility object. See Glossary #9.

20. Loop containing Sleep statement: Method of keeping a script active by performing a VBScript Sleep statement inside a loop.

21. Enumerating registered scripts: The ability to select one or more scripts registered with the SCRIPTMONITOR service based on their file name, account (user) name, or the user-settable description registered with the script.

22. Registered Scripts: Scripts that have been made known to the SCRIPTMONITOR service using the ScriptUtility object's Register method. A "registry" is a central hierarchical database in Windows used to store information necessary to configure the system for one or more users, applications and hardware devices.

23. Microsoft Task Scheduler: The Microsoft Task Scheduler is a tool that (in most cases) comes already with your Windows installation and "hides" in the "Control Panel"

folder that is located in the "My Computer" folder on your desktop. By using Task Scheduler, you can schedule tasks to run at a time that is most convenient for you. Task Scheduler starts each time you start Windows, and runs in the background. With Task Scheduler, you can: Schedule a task to run daily, weekly, monthly, or at certain times (such as system startup). This also relates to Glossary #6.

24. Script Utility Client: A program that uses the Script Utility. Defined in Glossary #7.

25. Do "work" (FIG. 1, block 11, 15): Perform one or more script statements. Doing "work" means the script does whatever task it was coded to do. For example, it can perform the tasks of displaying messages, create and use scriptable objects, copy files, etc.

26. Sleep process/Script sleeps: Process of causing a registered script to wait until awakened. The user can control whether the script is visible on the desktop while sleeping by setting the ScriptUtility Visible property. If visible, the user can also control what information is displayed by the sleeping script through the Description and MsgString properties. The script can be awakened through the SCRIPT-MONITOR service or the displayed dialog box (if visible).

27. Registration Handle (FIG. 2, block 22): A Unique identifier generated by the SCRIPTMONITOR service for each script registered with it.

28. Script Name: Simple name of script, such as "myscript.vbs"

29. File Name: Full path and name of script, such as "C:\Scripts\myscript.vbs".

30. ISCRIPTREGISTER interface: COM interface implemented by the SCRIPTMONITOR object to support registration of scripts.

31. Interval handler (FIG. 3): Process of creating and starting a timer which is associated with a ScriptUtility object and which will expire periodically. Expiration of the timer causes the script statements associated with the OnInterval event to be executed. The timer expires according to the setting of the interval property, which could be any number of seconds, or even never if the interval is set to zero. The "interval property" is defined in Glossary Item #34.

32. Expiration interval: Time interval to elapse between expirations of the OnInterval event, specified by the Interval property of the ScriptUtility object.

33. Interval property (of ScriptUtility Object): Time period to elapse before the interval timer expires. Must be set to a number greater than zero in order for the timer to begin running.

34. New Interval Timer: Timer associated with a ScriptUtility object that will expire periodically. Expiration of the timer causes the script statements associated with the OnInterval event to be executed.

35. Expired timer: OnInterval timer whose Interval period has elapsed, causing the timer to cancel.

36. OnInterval processing: Executing one or more script statements associated with the ScriptUtility OnInterval event. Essentially, a script goes through the process of setting the number of the Interval property to greater than zero, which in turn fires the OnInterval event for the first time after the number of seconds specified by the Interval property has elapsed. See Glossary #9. When the OnInterval handler completes, the timer is reset and the OnInterval event fires again when the number of seconds specified by the Interval property has again elapsed.

37. Object not sleeping?: A script that is already sleeping cannot invoke the Sleep method again until it has been awakened.

38. CSNOOZEDLG object (FIG. 4, Block 48): Internal object used to create the dialog box displayed by a sleeping script. The dialog box may or may not be visible on the desktop. See Glossary #42 to determine visibility or invisibility.

39. Description property: The string entered for the Description parameter to the ScriptUtility Register method. Also see Glossary #16.

40. MsgString property: A string property of the ScriptUtility object that defines a message to display when the ScriptUtility Sleep method is invoked, as indicated in Glossary #13.

41. Visible property: A Boolean property of the ScriptUtility object that controls the display of a message when the Sleep method is invoked. If this property is True, the message is displayed. If False, the message is not visible on the desktop.

42. Modeless dialog box: A dialog box whose display does not prevent interaction with the parent program.

43. WM quit message (FIG. 4, Item #48): Windows message used to terminate a program that responds to mouse clicks.

44. Message pump: Windows term for code that performs a loop to read messages from a queue and dispatch them to the appropriate subroutine for processing. The messages are most often related to the display of the user interface associated with the program.

45. Jscript: A Microsoft language that resembles Java but is simpler. Jscript is also very similar to JavaScript, a scripting language supported by the Netscape Navigator browser.

46. Awaken type: Value returned when continuing a sleeping script: either vbOK (1) or vbCancel (2).

47. Unregister method: ScriptUtility object method used to notify the SCRIPTMONITOR service that a registered script should no longer be monitored by the service.

48. Unregister script: Process of notifying the SCRIPT-MONITOR service that a script should no longer be monitored.

49. SCRIPTMONITOR (FIG. 3, #31): See "SCRIPTMONITOR Service", above, at Glossary #17.

50. ScriptData objects (FIG. 2, #25) Internal objects used by the SCRIPTMONITOR to contain data about registered scripts.

51. PID: This property returns the "process identifier" for a script. The process identifier is a number unique across the system.

52. ISCRIPTPOKE interface (FIG. 2, #24, FIG. 4, #48): COM interface implemented by the ScriptUtility object to support remote invocation of the Awaken method occurs when the SCRIPTMONITOR object calls it's awaken method on a script that has been registered with the Script Monitor service, that is, a remote invocation of awaken.

53. Sleep method (ScriptUtility): This method enables a script to sleep while waiting on other events without creating a message box to prevent itself from exiting. In a multiprocessing environment, a temporary state of suspension during which a process remains in memory, so that some event, such as an interrupt or call from another process, can "awaken" it; sleep implies to suspend operation without terminating the function.

54. Utility Program: A program designed to perform maintenance work on a system or system components. For example: a storage backup program, a disk and file recovery program, or a resource editor.

55. Object: In object oriented programming, a variable comprising both routines and data that is treated as a discrete entity.

56. Managing a script: In general, managing a script means running a particular script at an appropriate time on an appropriate system ("appropriate" as defined by the management policy set up by the user) and tracking its execution once run.

DETAILED DESCRIPTION OF PREFERRED EMBODIMENT

Referring now to the drawings and FIG. 1 in particular, a block diagram is shown of how the Script Monitoring method functions. The diagram begins with the process creating a Script Monitor Object (block 10), which then does some appropriate work (block 11). From there, an inquiry is made as to whether or not the script A should be awakened (Diamond 12). If the answer to this inquiry is no, a process to do some more work is initiated (block 11). Doing work means the script does whatever it is coded to do, for example, displaying messages, copying files, and creating and using scriptable objects. If the answer to this inquiry (step 12) is yes, another inquiry is made as to whether or not a selected script "A" is registered (Diamond 13). If the answer to this inquiry is no, a process to do more work is initiated (block 15), which then ends the entire process (bubble 16). If the answer to this inquiry (step 13) is yes, the script "A" is "awakened" (block 14), which, in turn, requires more work is to be done (block 15), which then exits the entire process (bubble 16).

Using a ScriptUtility object, a script can register with the Script Monitor service (block 17). The service in turn stores the registered scripts with the other registered scripts. When the second inquiry (Step 13) is made as to whether or not the script is registered, the service checks the stored list of registered scripts to answer the inquiry. If the answer is yes, a "registration handle" referencing the registered script is returned to the inquirer, which can then use the handle to awaken the registered script (block 14).

In FIG. 1, block 17 is the ScriptMonitor Service. One of the purposes of this service is to maintain a list of scripts that have registered with the service to be managed by it; that list is what is portrayed by block 18. Each registered script provides a link back to itself for the service to use to awaken or suspend the script. "Handles" is what is portrayed by block 19. Using a ScriptUtility object, a script can register with the Script monitor service (block 17). The service in turn, stores the registered scripts in a list with the other registered scripts (block 18). When the second inquiry (step 13) is made as to whether or not the script is registered, the service checks the stored list of registered scripts to answer the inquiry. If the answer is "YES", a "registration handle" referencing the registered script is returned to the inquirer, which can then use the handle to awaken the registered script (block 14). For example, the "registration handle" for the script with the ID "A" is a reference to the ScriptUtility object for script A; this example is shown at block 19.

Figure 2:
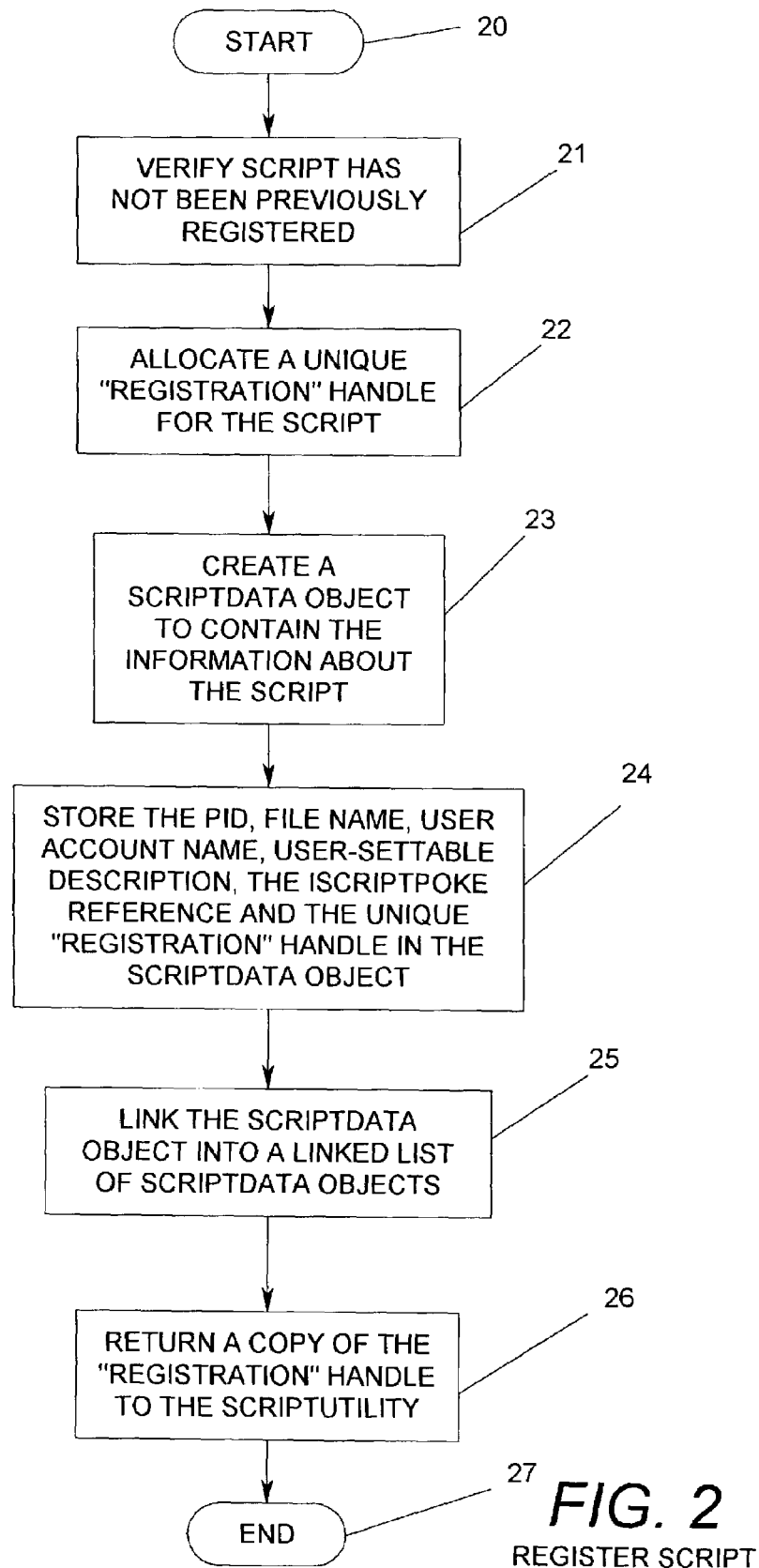
FIG. 2 is a flowchart illustrating the steps for registering a script.

FIG. 2 is a high-level flowchart that describes the register script process. The register script process begins with start bubble 20 followed by a process step (block 21) to verify that the script has not been previously registered. The process continues with another process step (block 22), which allocates a unique "Registration" handle for the script. The process continues with a subsequent process step (block 23), which creates a ScriptData object to contain identifying information about the script. At this point, a previously unregistered script has been made known to the Script Monitor service, with enough data saved off to allow the Script Monitor to identify this script uniquely in the list of all registered scripts. This, therefore, allows others scripts and programs to get information about the newly registered script through the service (and to awaken it should the script later invoke Sleep).

The process continues with process step (block 24), which stores the PID, file name, user account name, user-settable description, the ISCRIPTPOKE reference and the unique "Registration" handle (ID) in the ScriptData Object. The process continues with another process step (block 25), which links the ScriptData Object into a linked list of ScriptData objects. This is followed by another process step (block 26), which returns a copy of the "Registration" handle to the ScriptUtility. The process then exits (bubble 27).

Figure 3:
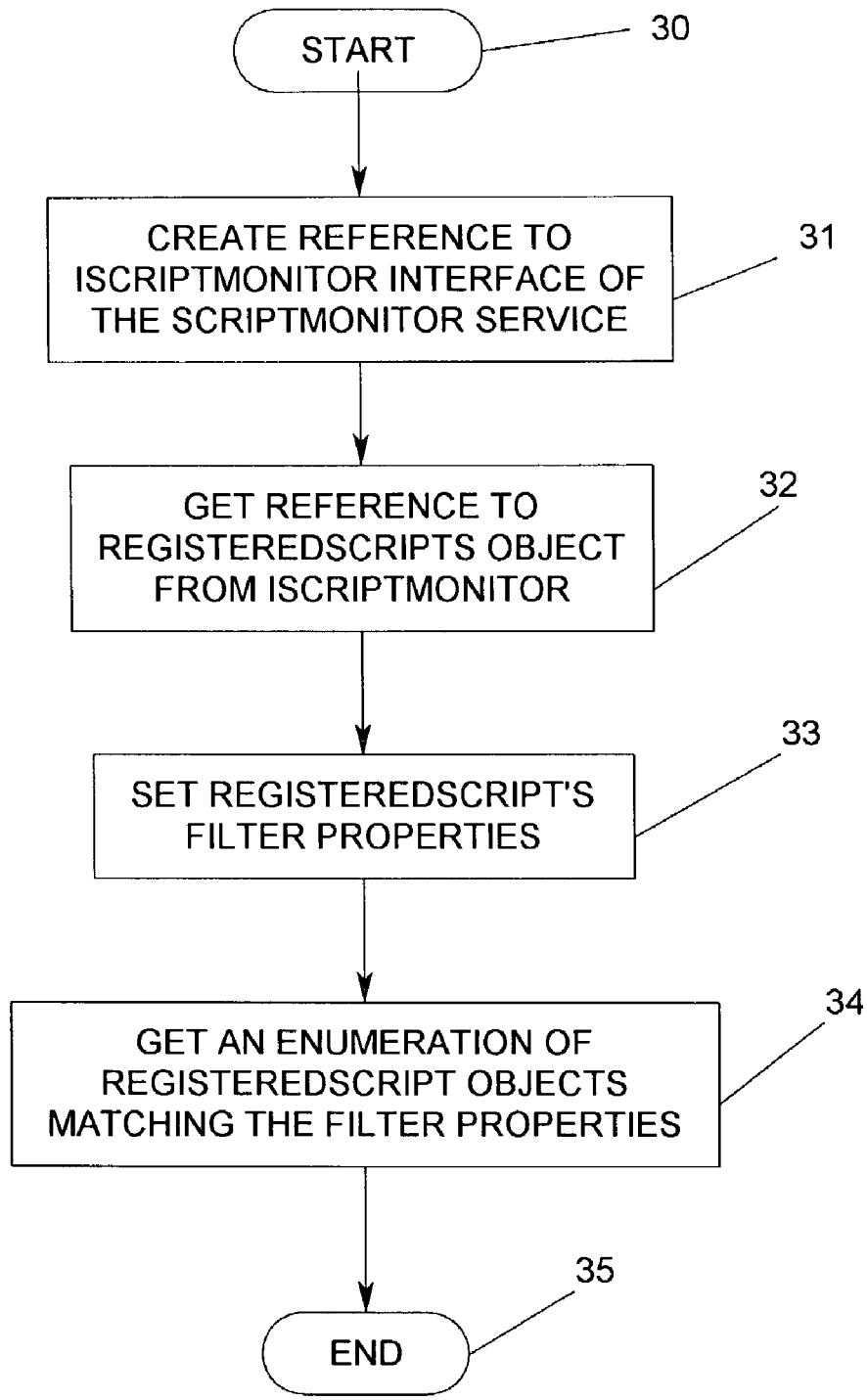
FIG. 3 is a flowchart illustrating the steps, which enable viewing of the list of registered scripts.

Now referring to FIG. 3, a flowchart that illustrates the steps for viewing a list of registered scripts is shown. The script or program essentially asks the Script Monitor service for a list of registered scripts meeting certain criteria (the "filter properties"), such as all scripts running under a certain usercode. The process begins with start bubble 30 followed by another process to create a reference to a ISCRIPT-MONITOR interface of the SCRIPTMONITOR service (block 31). The process continues with another process step (block 32), which gets a reference to REGISTERED-SCRIPTs object from ISCRIPTMONITOR. The process continues with another process that sets REGISTERED-SCRIPT'S filter properties (block 33). Another process is initiated which gets an enumeration of RegisteredScript Objects, which match the filter properties (block 34). This list, therefore, is returned as an enumeration, meaning the inquiring scripts or program can walk through the items on the list one at a time. The process then exits (bubble 35).

Figure 4:
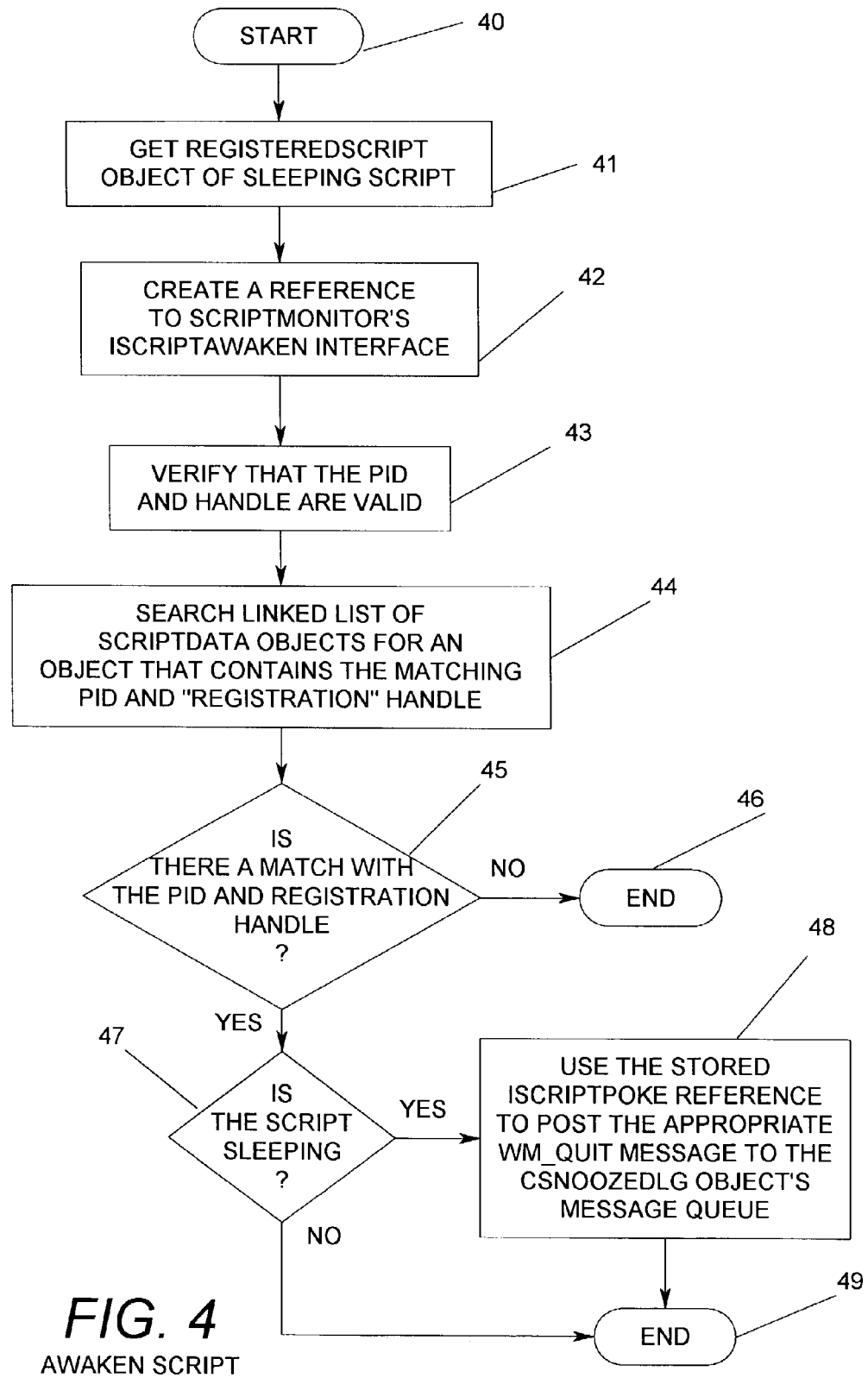
FIG. 4 is a flowchart that illustrates the steps for awakening a script.

Referring to FIG. 4, a high-level flowchart for awakening a script is shown. The process begins with start bubble 40 followed by a process step (block 41) to get the RegisteredScript Object for a sleeping script. The process then creates a reference to ScriptMonitor's ISCRIPTAWAKEN interface (block 42).

The ISCRIPTAWAKEN interface of the ScriptMonitor supports the AwakenScript method. The AwakenScript method is what is used to awaken a sleeping script that has registered with the ScriptMonitor.

The ISCRIPTPOKE is an interface to a call-back procedure in the Script Utility. A reference to the call-back procedure is one of the parameters that is passed to the ScriptMonitor when a script is registered. The reference to the procedure and the other parameters are stored within the ScriptMonitor (FIG. 2, block 24). It is this call-back procedure that is used by the AwakenScript method to awaken a script. The call-back procedure is also used by the Script- Monitor to verify that a script is still running (by calling the procedure with a special value).

The process then continues with another process step (block 43) to verify that the PID and handle of the selected script are valid. The process then continues with another process (block 44) that searches the linked list of ScriptData objects for an object that contains the matching PID and "Registration" handle (block 44) of the selected script. This is followed by an inquiry to see whether or not there is a match with the PID and registration handle (Diamond 45). If the answer to this inquiry is no, the process exits (bubble 46). If the answer to this inquiry (step 45) is yes, another inquiry is made to see whether or not the script is sleeping (Diamond 47). If the answer to this inquiry is no, the process exits (bubble 49). If the answer to this inquiry (step 47) is yes, a process is initiated to use the stored ISCRIPTPOKE reference to post the appropriate WM_QUIT message to the message queue of the sleeping script's CSNOOZEDLG object (block 48). The process then exits (bubble 49).

Described herein has been a specialized method for the management and monitoring of scripts that are registered. Here, a Script Monitor object is created whereby a series of scripts can be tracked and monitored. Means are provided for registering a script by allocating a unique "registration handle", and returning a copy of this to the ScriptUtility, or else unregistering a registered script, or viewing lists of registered scripts by getting an enumeration of REGISTEREDSCRIPT objects matching the filter properties, and for awakening a script, once verified that the script is in fact sleeping.

While a preferred embodiment of the invention has been described, other variations and embodiments may be developed which still fall within the scope of the invention as defined in the following claims.

What is claimed is:

1. A computer implemented method for helping application operations by establishing script monitoring availability and enabling external control by a user in handling scripts and which utilizes any script which supports a Component Object Model (COM) interface, said method comprising the steps of:
    (a) creating a Script Monitor Object to enable the registry of scripts;
    (b) determining whether a selected script should be awakened;
    (c) determining whether said selected script is registered;
    (d) awakening said selected script, if registered;
    (e) accessing a Script Monitor Service, which registers said selected script in a list of scripts;
    (f) transmitting said registered script to a Script Utility Object, which supports various functionalities for said registered script, wherein said functionalities include the steps of:
        (f1) enabling said selected script to sleep;
        (f2) awakening said selected script;
        (f3) registering and unregistering said selected script;
        (f4) setting of time intervals for the awakening of said selected script.
        (f5) enabling steps (f1), (f2), (f3), (f4) to operate via external control by said user.

2. The method of claim 1 wherein a Script Utility Sleep task enables a script to be held in suspension in a hidden dialog box without terminating its function and enabling it to become active upon occasion of a selected event, and wherein said Script Utility Object supports functionalities which include the steps of:
    (f6) enabling the visibility of said hidden dialog box;
    (f7) describing the functions of said selected script;
    (f8) defining a message for display when said Script Utility Sleep task is invoked;
    (f9) executing a script "awakening" event after the elaspse of a preset interval of time;
    (f10) enabling full-time external control by said user for the handling of script functions.

3. In a Script Utility for helping application operations to be enhanced by user control for monitoring useful scripts, including a SCRIPTMONITOR Service which allows selection of registered scripts based on file name, user account name or user-settable description, and which utilizes any script which supports a Component Object Model (COM) interface, a computer implemented method for registering of scripts comprising the steps of:
    (a) verifying with the Script Utility that a script has not been previously registered;
    (b) allocating a registration handle to place an identity for said script;
    (c) creating a ScriptData Object to hold information about registered scripts;
    (d) storing a set of information parameters in said created ScriptData Object wherein step (d) includes:
        (d1) storing for each script, a process identification (PID), the file name involved, the user account name, the user-settable description, and an interface to support invocation of a script-awaken and said registration handle for the script;
    (e) linking said ScriptData Object into a linked-list of other ScriptData Objects;
    (f) returning a copy of said registration handle, of step (b), to said Script Utility;
    (g) enabling full-time external control to said user for monitoring of said useful scripts.

4. In a Script Utility for helping application operations and which utilizes any script which Supports a Component Object Model (COM) interface and wherein a SCRIPTMONITOR service in a Script Utility enables a user to monitor and manage registered scripts having a Registered Script Object indicating filter properties, based on their file name, account name or Process Identification (PID), a computer implemented method of enabling user control for showing a list of registered scripts comprising the steps of:
    (a) establishing a console interface designated as said SCRIPTMONITOR Service in said Script Utility;
    (b) creating a reference from said SCRIPTMONITOR Service to a Registered Script Object;
    (c) setting said filter properties for said Registered Script Object;
    (d) displaying those Registered Script Objects which match the filter properties;
    (e) enabling external full-time user control for displaying a list of registered scripts.

5. In a computer implemented method for enhancing application operations utilizing a Script Monitor in a Script Utility Object, wherein said Script Utility Object provides an ISCRIPTAWAKEN interface in said Script Monitor which supports an Awaken Script method used to awaken a selected sleeping script that was registered in said Script Monitor, and also provides a process ID (PID) which is a unique identification number, and said Script Utility Object also implements a remote invocation of Awaken Script method when said Script Monitor calls its Awaken Script method on a registered script, said implementation being designated as INSCRIPTPOKE, said Script Monitor also generating a unique registration handle identifier for each script, a method for enabling user control of awakening scripts comprising the steps of:

(a) accessing a registered script Object of said selected sleeping script;
(b) creating a reference to the ISCRIPTAWAKEN interface of said Script Monitor;
(c) verifying that said process ID (PID) and script registration handle are valid;
(d) searching a linked list of ScriptData Objects to find an Object containing a matching PID and registration handle;
(e) querying to see if there is a match to said PID and registration handle;
(f) querying if said selected sleeping script is sleeping when said match occurs in step (e);
(g) using a stored reference (ISCRIPTPOKE) to invoke an awakening of said selected sleeping script said awakening being under complete external user control.

6. The computer implemented method of claim 5 wherein a CSNOOZEDLG Object is used to create a dialog box and said method includes the step of:

(h) posting a WM_Quit Windows Message to a message queue in said CSNOOZEDLG Object used to create said dialog box displayed by said selected sleeping script;
(i) terminating said dialog box and message queue.

* * * * *